(12) United States Patent
Krishnamurthy et al.

(10) Patent No.: US 12,711,658 B2
(45) Date of Patent: Aug. 18, 2026

(54) ITEM LOCATION TRACKING FOR DISPLAY RACKS USING DIGITAL IMAGE PROCESSING

(71) Applicant: 7-Eleven, Inc., Irving, TX (US)

(72) Inventors: Sailesh Bharathwaaj Krishnamurthy, Irving, TX (US); Sumedh Vilas Datar, Grapevine, TX (US); Shantanu Yadunath Thakurdesai, Denton, TX (US); Crystal Maung, Dallas, TX (US); Mohit Satish Joshi, Somerville, MA (US)

(73) Assignee: 7-Eleven, Inc., Irving, TX (US)

( * ) Notice: Subject to any disclaimer, the term of this patent is extended or adjusted under 35 U.S.C. 154(b) by 765 days.

(21) Appl. No.: 17/471,027

(22) Filed: Sep. 9, 2021

(65) Prior Publication Data

US 2023/0076979 A1 Mar. 9, 2023

(51) Int. Cl.

*G06T 7/73* (2017.01)
*G06V 10/75* (2022.01)
*G06V 20/52* (2022.01)

(52) U.S. Cl.

CPC .............. *G06T 7/74* (2017.01); *G06V 10/751* (2022.01); *G06V 20/52* (2022.01); *G06T 2207/20221* (2013.01); *G06T 2207/30204* (2013.01)

(58) Field of Classification Search

CPC ............. G06T 7/74; G06T 2207/20221; G06T 2207/30204; G06V 20/52; G06V 10/751
USPC .......................................................... 382/103
See application file for complete search history.

(56) References Cited

U.S. PATENT DOCUMENTS 8,189,855 B2 5/2012 Opalach et al.
10,565,548 B2 2/2020 Skaff et al.
10,789,720 B1 * 9/2020 Mirza .................... G06T 7/246
(Continued)

FOREIGN PATENT DOCUMENTS

EP 3032459 A1 6/2016

OTHER PUBLICATIONS

Agnihotram; Gopichand et al: "Combination of Advanced Robotics and Computer Vision for Shelf Analytics in a Retail Store", 2017 IEEE International Conference on Information Technology, Dec. 21, 2017, pp. 119-124.
(Continued)

*Primary Examiner* — Stephen S Hong
*Assistant Examiner* — Tionna M Burke
(74) *Attorney, Agent, or Firm* — Baker Botts L.L.P.

(57) ABSTRACT

A device configured to receive a rack identifier for a rack that is configured to hold items. The device is further configured to identify a master template that is associated with the rack. The device is further configured to receive images of the plurality of items on the rack and to combine the images into a composite image of the rack. The device is further configured to identify shelves on the rack within the composite image and to generate bounding boxes that correspond with an item on the rack. The device is further configured to associate each bounding box with an item identifier and an item location. The device is further configured to generate a rack analysis message based on a comparison of the item locations for each bounding box and the rack positions from the master template and to output the rack analysis message.

24 Claims, 7 Drawing Sheets

(56) References Cited

U.S. PATENT DOCUMENTS

| | | | | |
|---|---|---|---|---|
| 2013/0173435 | A1* | 7/2013 | Cozad, Jr. | G06Q 10/087 705/28 |
| 2015/0088703 | A1* | 3/2015 | Yan | G06Q 10/087 705/28 |
| 2016/0171429 | A1* | 6/2016 | Schwartz | G06T 7/90 382/103 |
| 2018/0260767 | A1* | 9/2018 | Findlay | G06Q 10/087 |
| 2020/0005225 | A1 | 1/2020 | Chaubard | |
| 2021/0192756 | A1* | 6/2021 | Huang | G06N 3/045 |
| 2021/0216954 | A1* | 7/2021 | Chaubard | G06T 11/203 |

OTHER PUBLICATIONS

Moorthy; Rahul et al: "Applying Image Processing for Detecting On-Shelf Availability and Product Positioning in Retail Stores", 2015 Third International Symposium on Women in Computing and Informatics, Aug. 10, 2015, pp. 451-457.

Rosado; Luis et al: "Supervised Learning for Out-of-Stock Detection in Panoramas of Retail Shelves", 2016 IEEE International Conference On Imaging Systems and Techniques, Oct. 4, 2016, pp. 406-411.

International Search Report and Written Opinion of International Application No. PCT/US2022/076085 mailed Jan. 10, 2023.

* cited by examiner

ITEM LOCATION TRACKING FOR DISPLAY RACKS USING DIGITAL IMAGE PROCESSING

TECHNICAL FIELD

The present disclosure relates generally to digital image processing, and more specifically to item location tracking for display racks using digital image processing.

BACKGROUND

Identifying and tracking objects within a space poses several technical challenges. Tracking and determining the locations of items on a display rack poses a technical challenge when a user is unable to capture a complete image of the rack. For example, the rack may be in a location that does not allow the user to capture the entire the rack within a single image. In this example, the user may be forced to capture multiple images of the rack from different positions. Existing systems are unable to associate the identified items with items from other images in this situation. This issue prevents existing systems from being able to analyze an entire rack when the rack cannot be captured within a single image. In other examples, the user may be able to capture an image of the entire rack by standing some distance away from the rack. However, in this case, the distance between the user and the rack may cause items in the image to become too small to be identified using existing image processing techniques. Trying to identify items using a few number of pixels requires a significant amount of time which means that this process is not compatible with real-time applications. In addition, this process may lead to inaccurate results and wasted processing resources.

SUMMARY

The system disclosed in the present application provides a technical solution to the technical problems discussed above by using a combination of image processing techniques to identify and track the location of items that are placed on a display rack. The disclosed system provides several practical applications and technical advantages which include a process for generating a composite image of a rack from multiple images of the rack and then analyzing the composite image to determine whether the items are in their correct locations on the rack. As previously discussed, obtaining an image of a complete rack is often not possible. This process provides a practical application by enabling a computing device to analyze items on a rack using multiple images of the rack. This process allows the system to analyze items from different portions of the rack to perform a complete analysis of all the items on the rack. These practical applications not only improve the system's ability to identify items but also improve the underlying network and the devices within the network. For example, this disclosed process allows the system to service a larger number of users by reducing the amount of time that it takes to identify items on a rack. In other words, this process improves hardware utilization without requiring additional hardware resources which increases the number of hardware resources that are available for other processes and increases the throughput of the system. Additionally, these technical improvements allow for scaling of the item tracking functionality described herein.

In one embodiment, the item tracking system comprises a device that is configured to receive a rack identifier for a rack that is configured to hold items. The device is further configured to identify a master template that is associated with the rack. The master template comprises information about the designated position for items that are placed on the rack. The device is further configured to receive images of the plurality of items on the rack and to combine the images to generate a composite image of the rack. The device is further configured to identify shelves on the rack within the composite image and to generate bounding boxes that correspond with an item on the rack. The device is further configured to associate each bounding box with an item identifier and an item location. The device is further configured to generate a rack analysis message based on a comparison of the item locations for each bounding box and the rack positions from the master template and to output the rack analysis message.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

System Overview

Figure 1:
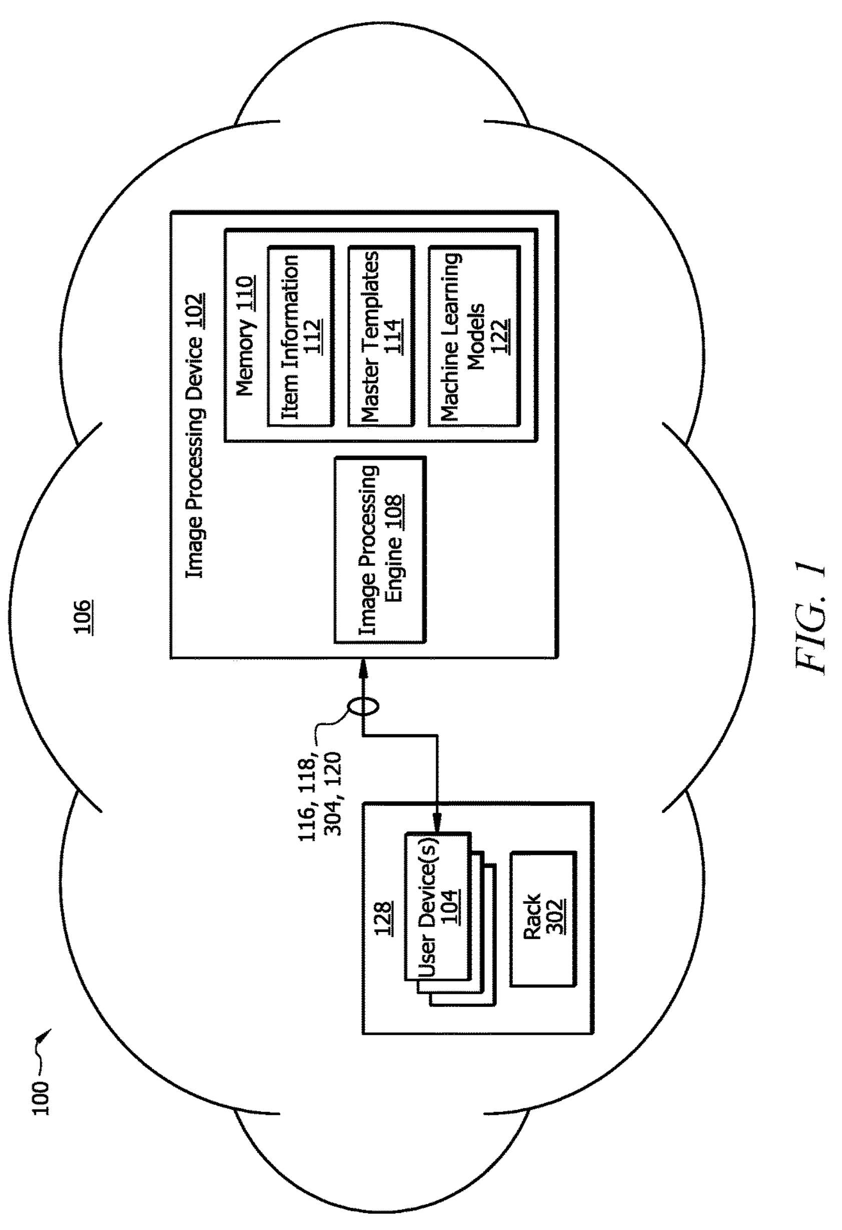
FIG. 1 is a schematic diagram of an embodiment of an item tracking system that is configured to employ digital image processing.
Figure 3A:
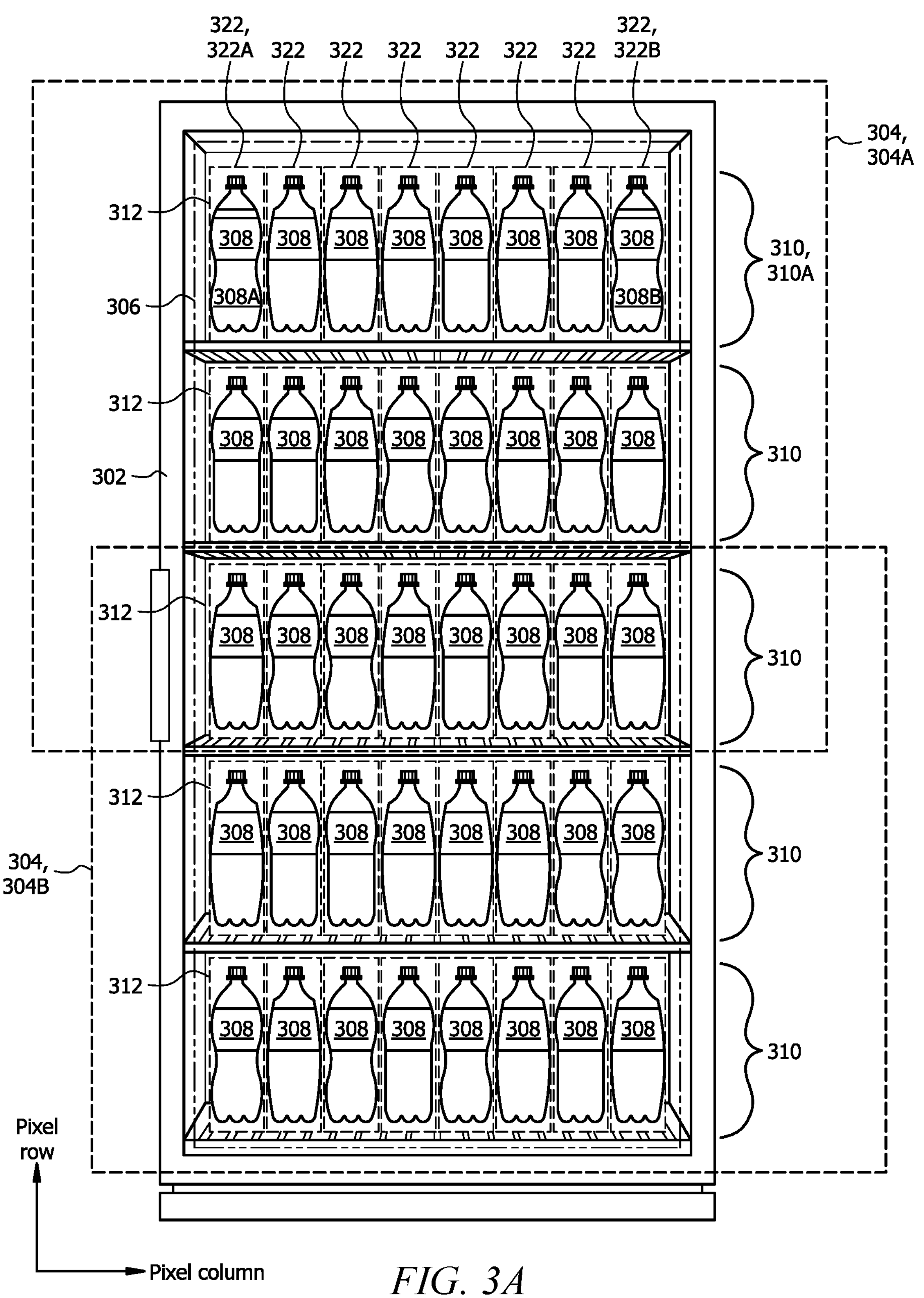
FIG. 3A is an example of a composite image of items on a rack.

FIG. 1 is a schematic diagram of an embodiment of an item tracking system 100 that is configured to employ digital image processing to track objects within a space 128. The space 128 is an area that comprises one or more racks 302 (e.g. item display racks). Each rack 302 comprises one or more shelves 310 that are configured to hold and display items 308. An example of a rack 302 and shelves 310 is shown in FIG. 3A. Continuing with reference to FIG. 3A, the item tracking system 100 is generally configured to generate a composite image 306 of a rack 302 from multiple images 304 of the rack 302 and to analyze the composite image 306 to determine whether the items 308 are in their correct locations on the rack 302. This process provides a practical application by enabling an image processing device 102 to analyze items 308 on a rack 302 using multiple images 304 of the rack 302. This process allows the item tracking system 100 to analyze items 308 from different portions of the rack 302 to perform a complete analysis of all the items 308 on the rack 302.

Referring back to FIG. 1, in one embodiment, the space 128 is a store that comprises a plurality of items 308 that are available for purchase. In this example, the store may be a convenience store or a grocery store. In other examples, the store may not be a physical building, but a physical space or environment where shoppers may shop. For example, the store may be a grab-and-go pantry at an airport, a kiosk in an office building, an outdoor market at a park, etc. Although the example of a store is used in this disclosure, this disclosure contemplates that the item tracking system 100 may be installed and used in any type of physical space (e.g. a room, an office, an outdoor stand, a mall, a supermarket, a convenience store, a pop-up store, a warehouse, a storage center, an amusement park, an airport, an office building, etc.). Generally, the item tracking system 100 (or components thereof) is used to track the positions of objects within these spaces 128 for any suitable purpose.

In one embodiment, the item tracking system 100 comprises an image processing device 102 and one or more user devices 104 that are in signal communication with each other over a network 106. The network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 106 may be configured to support any suitable type of communication protocol as would be appreciated by one of ordinary skill in the art.

User Devices

Examples of user devices 104 include, but are not limited to, a smartphone, a tablet, a laptop, a computer, or any other suitable type of device. Each user device 104 is configured to send an image processing request 116 to the image processing device 102 to request an analysis of items 308 that are placed on a rack 302, as illustrated in FIG. 3A. The image processing request 116 comprises a rack identifier 118 for a rack 302 and a plurality of images 304 of at least a portion of the rack 302. The rack identifier 118 may be a name, an address, an alphanumerical value, or any other suitable type of identifier that uniquely identifies a rack 302. The user device 104 may be configured to send the image processing request 116 to the image processing device 102 using any suitable type of messaging technique or protocol. For example, the user device 104 may be configured to send the image processing request 116 to the image processing device 102 using an application or a web browser. The user device 104 is further configured to output or display a rack analysis message 120 from the image processing device 102. The rack analysis message 120 indicates whether there is a mismatch between the locations of items 308 in the provided images 304 and the locations of items 308 in a master template 114 that is associated with the rack 302. The user device 104 may comprise a graphical user interface (e.g. a display or touchscreen) that is configured to display results from a rack analysis message 120 to a user.

Image Processing Device

Examples of the image processing device 102 include, but are not limited to, a server, a computer, or any other suitable type of network device. In one embodiment, the image processing device 102 comprises an image processing engine 108 and a memory 110. Additional details about the hardware configuration of the image processing device 102 are described in FIG. 7. The memory 110 is configured to store item information 112, master templates 114, machine learning models 122, and/or any other suitable type of data.

In one embodiment, the image processing engine 108 is generally configured to process images 304 of a rack 302 to determine the locations of items 308 that are placed on the rack 302. The image processing engine 108 is further configured to compare the locations of items 308 on the rack 302 to a master template 114 that is associated with the rack 302. Each master template 114 is associated with one or more racks 302 and comprises information about the position of items 308 that are placed on a rack 302. A master template 114 identifies rack positions that correspond with a shelf 310 of the rack 302 and a location on the shelf 310 where an item 308 is placed. Each rack position is associated with a particular item 308 or item identifier that identifies the item 308 that is at a given rack position. The image processing engine 108 is further configured to determine whether the locations of items 308 in the images 304 match the locations of items 308 in the master template 114. The image processing engine 108 is further configured to output a rack analysis message 120 based on the comparison. The rack analysis message 120 indicates whether there is a mismatch between the locations of items 308 in the images 304 and the locations of items 308 in the master template 114. A mismatch between the locations of items 308 in the images 304 and the locations of items 308 in the master template 114 indicates that one or more items 308 are in the wrong location on the rack 302. A match between the locations of items 308 in the images 304 and the locations of items 308 in the master template 114 indicates that all of the items 308 are in their correct location on the rack 302. An example of the image processing engine 108 in operation is described in more detail below in FIG. 2.

Examples of machine learning models 122 include, but are not limited to, a multi-layer perceptron, a recurrent neural network (RNN), an RNN long short-term memory (LSTM), a convolution neural network (CNN), a transformer, or any other suitable type of neural network model. In one embodiment, the machine learning model 122 is generally configured to receive at least a portion of an image (e.g. a composite image 306) as an input and to output an item identifier based on the provided image 304. The machine learning model 122 is trained using supervised learning training data that comprises different images of items 308 with their corresponding labels (e.g. item identifiers). During the training process, the machine learning model 122 determines weights and bias values that allow the machine learning model 122 to map images of items 308 to different item identifiers. Through this process, the machine learning model 122 is able to identify items 308 within an image. The image processing engine 108 may be configured to train the machine learning models 122 using any suitable technique as would be appreciated by one of ordinary skill in the art. In some embodiments, the machine learning model 122 may be stored and/or trained by a device that is external from the image processing device 102.

The item information 112 generally comprises information that is associated with one or more of a plurality of items 308. Examples of item information 112 include, but are not limited to, prices, weights, barcodes, item identifiers, item numbers, features of items 308, images of items 308, or any other suitable information that is associated with an item 308. Examples of features of an item 308 include, but are not limited to, text, logos, branding, colors, barcodes, patterns, a shape, or any other suitable type of attributes of an item 308.

An Item Location Tracking Process

Figure 2:
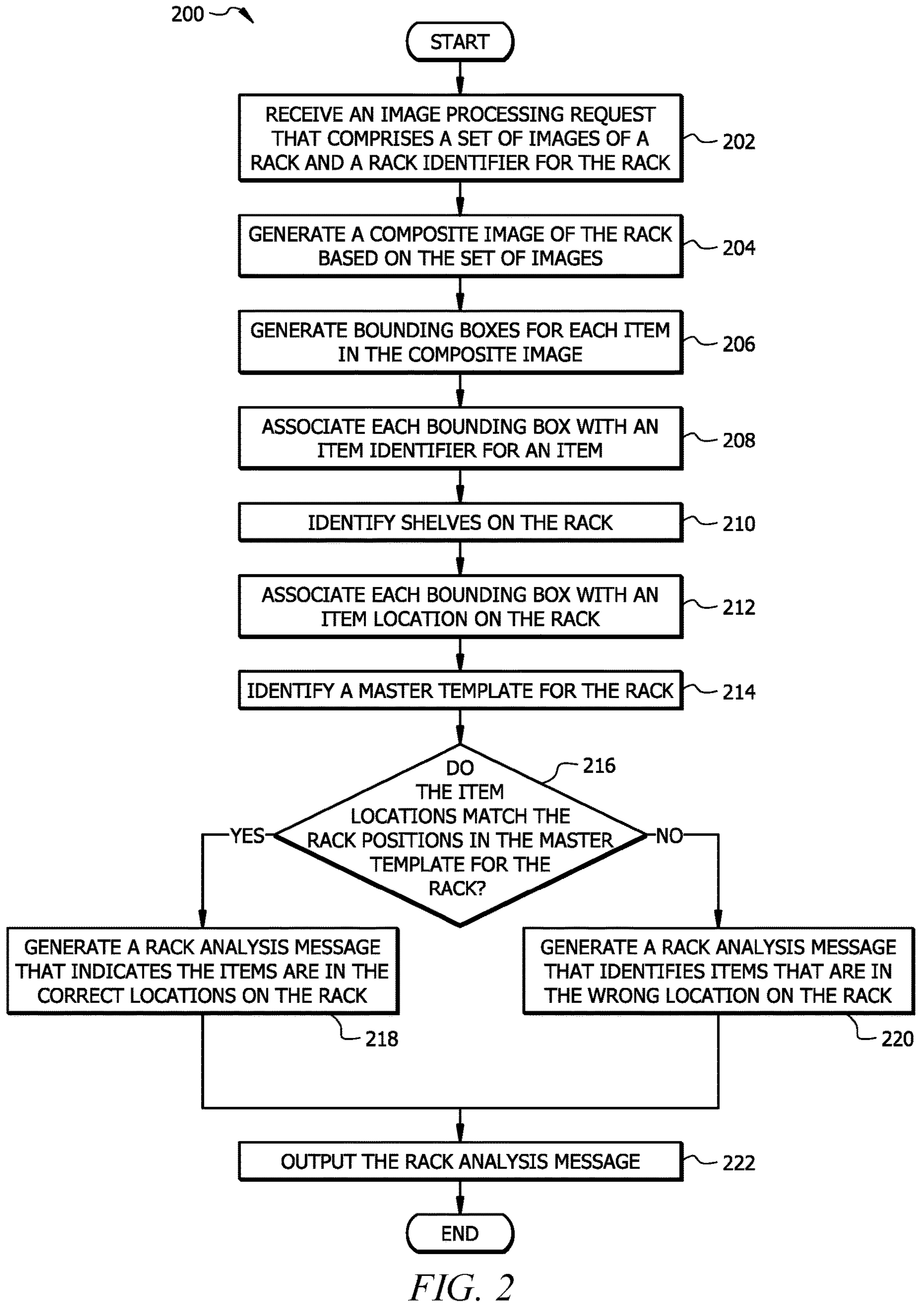
FIG. 2 is a flowchart of an embodiment of an item location tracking process for the item tracking system.

FIG. 2 is a flowchart of an embodiment of an item location tracking process 200 for the item tracking system 100. The item tracking system 100 may employ process 200 to detect whether any items 308 are placed in the wrong location on a rack 302. Process 200 employs various digital image processing techniques to reduce the amount of time that is required to inspect items 308 on a rack 302. This process generally involves 1) generating an image (i.e. a composite image 306) of a rack 302 using multiple images 304 of different portions of the rack 302, 2) identifying items 308 that are located in the image of the rack 302, 3) determining the locations of the items 308 with respect to the rack 302 in the image, 4) comparing the locations of the items 308 in the image to the locations for the items 308 that is defined by a master template 114 that is associated with the rack 302, and 5) outputting a rack analysis message 120 that indicates whether the items 308 are in the correct locations in the image based on the comparison. This process allows the item tracking system 100 to reduce the amount of time it takes to analyze a rack 302, and thereby, increase the amount of data that can be processed to analyze other racks 302.

Generating a Composite Image

At step 202, the image processing device 102 receives an image processing request 116 that comprises the rack identifier 118 for the rack 302 and the images 304 of the rack 302 from the user device 104. As a non-limiting example, a user may use a user device 104 to capture multiple images 304 of a rack 302 to send to the image processing device 102 for processing to determine whether items 308 on the rack 302 are in the correct locations. Each image 304 comprises at least a portion of the rack 302. Referring to FIG. 3A as an example, the user device 104 may capture a first image 304A of an upper portion of the rack 302 and a second image 304B of a lower portion of the rack 302. In this example, the first image 304A and the second image 304B at least partially overlap. In this case, a common portion of the rack 302 is present in both the first image 304A and the second image 304B. In other examples, the first image 304A and the second image 304B may not overlap. In other examples, the user device 104 may capture three, four, or any other suitable number of images 304 of the rack 302.

After capturing images 304 of the rack 302, the user device 104 generates an image processing request 116 that comprises a rack identifier 118 and the images 304 of the rack 302. The rack identifier 118 may be a name, an address, a numerical value, an alphanumerical value, or any other suitable type of identifier that uniquely identifies the rack 302. The user device 104 sends the image processing request 116 to the image processing device 102. The user device 104 may send the image processing request 116 to the image processing device 102 using any suitable type of messaging technique or protocol. For example, the user device 104 may send the image processing request 116 to the image processing device 102 using an application or a web browser.

After receiving the image processing request 116, the image processing device 102 obtains the rack identifier 118 and the images 304 from the image processing request 116. In one embodiment, the images 304 are arranged sequentially. For example, the image 304 may be arranged in order to capture the rack 302 from top to bottom, bottom to top, or from side to side. In some examples, the images 304 may have file names that indicate an order for the images 304 to be arranged. At step 204, the image processing device 102 generates a composite image 306 of the rack 302 based on the set of images 304. The image processing device 102 generates the composite image 306 by merging or stitching together images 304 from the received set of image 304. The images 304 from the user device 104 are sometimes only able to capture a portion of the rack 302 and a subset of the items 308 that are located on the rack 302. The composite image 306 combines information from all of the images 304 to form a single image that captures all of the items 308 that are located on the rack 302. Referring again to the example in FIG. 3A, the user device 104 may capture a first image 304A of an upper portion of the rack 302 and a second image 304B of a lower portion of the rack 302. In this example, the image processing device 104 will combine the first image 304A and the second image 304B to form a composite image 306. In other examples, the images 304 may capture different portions of the rack 302. For instance, the images 304 may capture the rack 302 from top to bottom, bottom to top, in quadrants, or from side to side. In this case, the image processing device 102 will sort the images 304 based on the portions of the rack 302 they capture and then combine the images 304 to form a composite image 306.

The image processing device 102 may use any suitable technique or algorithm to stitch together images 304. For example, the image processing device 102 may first identify a set of common features that are present within the images 304. Examples of common features include, but are not limited to, text, corners, edges, patterns, or any other suitable type of feature. After identifying common features between two images 304, the image processing device 102 then registers the two images 304 by converting the two images 304 into a common image plane. For example, the image processing device 104 may register the images 304 by aligning and overlapping the images 304 based on the identified common features. After registering the two images 304, the image processing device 102 merges the two images 304 to form a composite image 306 or a portion of a composite image 306. The image processing device 102 repeats this process of registering and merging images 304 until a complete composite image 306 is formed. While generating the composite image 306, the image processing device 102 may apply any suitable warping or rotating image processing techniques to account for perspective distortion and/or any rotational differences between the images 304.

Identifying Objects in the Composite Image

Figure 3C:
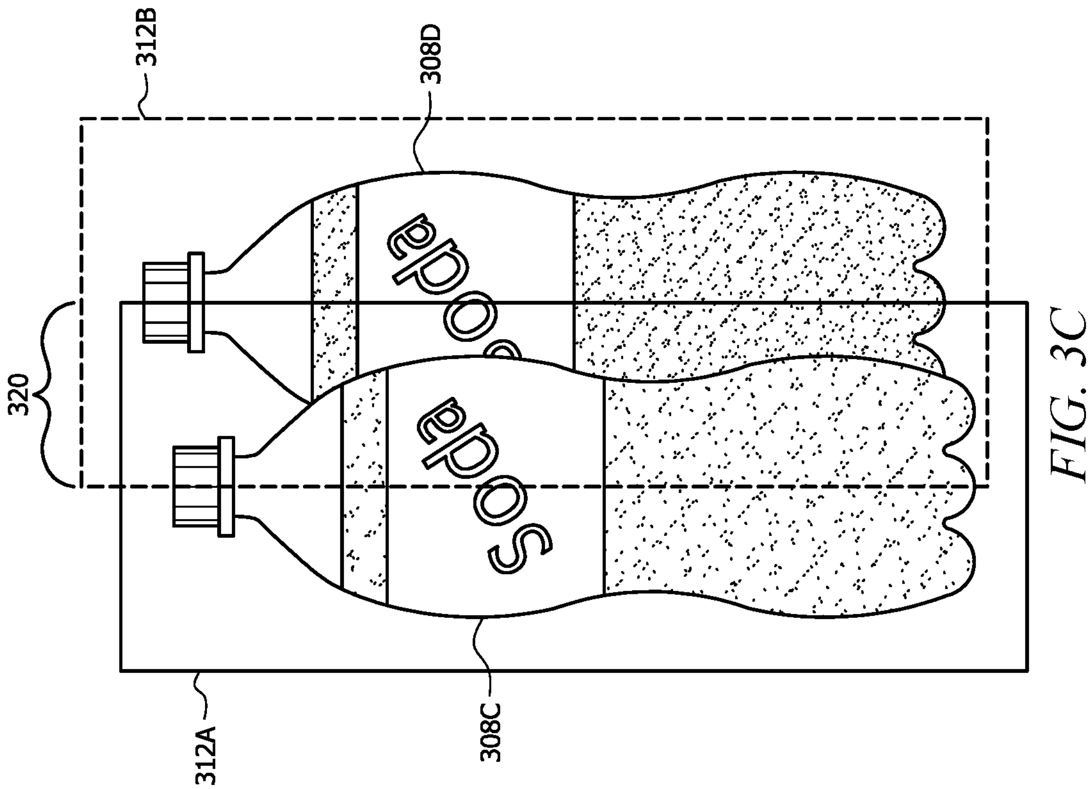
FIG. 3C is an example of overlapping bounding boxes for items on the rack.
Figure 3B:
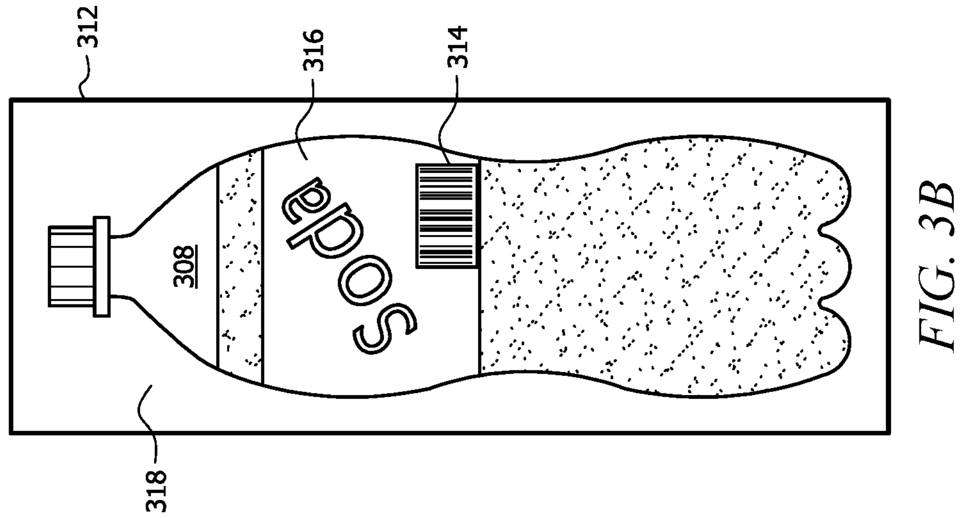
FIG. 3B is an example of an item within a bounding box from a composite image of a rack.

After generating the composite image 306, the image processing device 102 processes the composite image 306 to identify the items 308 that are located on the rack 302 in the composite image 306. This process generally involves identifying portions of the composite image 306 that contain items 308 using bounding boxes 312 and then identifying the items 308 that are within each bounding box 312. Returning to FIG. 2 at step 206, the image processing device 102 generates bounding boxes 312 for each item 308 in the composite image 306. As an example, the image processing device 102 may employ object detection and/or optical character recognition (OCR) to identify text, logos, branding, colors, barcodes, or any other features of an item 308 that can be used to identify items 308 within the composite image 306. FIG. 3B shows an example of a portion of the composite image 306. In this example, the image processing device 102 processes this portion of the composite image 306 to determine whether an item 308 is present. The image processing device 102 may process pixels within the portion of the composite image 306 to identify text 316, colors, barcodes 314, patterns, or any other characteristics of an item 308. The image processing device 102 may then compare the identified features of the item 308 to a set of features that correspond with different items 308. For instance, the image processing device 102 may extract text 316 (e.g. a product name) from the composite image 306 and may compare the text 316 to a set of text that is associated with different items 308. As another example, the image processing device 102 may determine a dominant color within the composite image 306 and may compare the dominant color to a set of colors that are associated with different items 308. As another example, the image processing device 102 may identify a barcode 314 within the composite image 306 and may compare the barcode 314 to a set of barcodes that are associated with different items 308. As another example, the image processing device 102 may identify logos or patterns within the composite image 306 and may compare the identified logos or patterns to a set of logos or patterns that are associated with different items 308. In other examples, the image processing device 102 may identify any other suitable type or combination of features from the composite image 306 and compare the identified features to features that are associated with different items 308.

Returning to FIG. 2, after comparing the identified features from the composite image 306 to the set of features that are associated with different items 308, the image processing device 102 then determines whether a match is found. The image processing device 102 may determine that a match is found when at least a meaningful portion of the identified features match features that correspond with an item 308. In response to determining that a meaningful portion of features within the composite image 306 match the features of an item 308, the image processing device 102 may generate a bounding box 312 that contains the pixels within the composite image 306 that correspond with the identified item 308. The image processing device 102 may repeat this process to detect all of the items 308 on the rack 302 in the composite image 306. In other examples, the image processing device 102 may employ any other suitable technique for generating bounding boxes 312.

In some embodiments, the composite image 306 may have a perspective view of the items 308 on the rack 302 which may cause some items 308 that are placed in front of each other to appear side by side. Referring to FIG. 3C as an example, a first item 308C is placed in front of a second item 308D on the rack 302. In this example, the image processing device 102 may incorrectly identify the second item 308D as being placed next to the first item 308C on the shelf 310. This issue will cause problems later when the image processing device 102 compares the order of items 308 on each shelf 310 of the rack 302 to the order of items 308 in the master template 114. To correct this issue, the image processing device 102 may remove a bounding box 312 when the bounding box 312 overlaps with another adjacent bounding box 312. The image processing device 102 may first identify an overlap region 320 between a first bounding box 312A and a second bounding box 312B. The image processing device 102 then determines an overlap percentage that corresponds with the overlap region 320. The image processing device 102 then compare the overlap percentage to a predetermined threshold value. The predetermined threshold value may be set to twenty-five percent, thirty percent, fifty percent, or any other suitable percentage value. When the overlap percentage is less than the predetermined threshold value, the image processing device 102 may keep both the first bounding box 312 and the second bounding box 312. When the overlap percentage is greater than or equal to the predetermined threshold value, the image processing device 102 may remove either the first bounding box 312 or the second bounding box 312. This process reduces the likelihood that the image processing device 102 will incorrectly identify the order of items 308 on the rack 302.

Returning to FIG. 2 at step 208, the image processing device 102 associates each bounding box 312 with an item identifier for an item 308. Here, the image processing device 102 identifies an item 308 that is in each bounding box 312 based on the features of the item 308 in the bounding box 312. The image processing device 102 begins this process by extracting a portion of the composite image 306 within a bounding box 312. For example, the image processing device 102 may crop the portion of the composite image 306 that is outside of the bounding box 312. FIG. 3B shows an example of a cropped portion of the composite image 306 that contains an item 308. This process allows the image processing to generate a new image 318 of the item 308 that is within the bounding box 312. The image processing device 102 then processes the new image 318 to identify the item 308 within the bounding box 312.

As an example, the machine learning model 122 may be a CNN. In this example, the machine learning model 122 includes an input layer, an output layer, and one or more hidden layers. The hidden layers include at least one convolution layer. For example, the machine learning model 122 may include the following sequence of layers: input layer, convolution layer, pooling layer, convolution layer, pooling layer, one or more fully connected layers, output layer. Each convolution layer of machine learning model 122 uses a set of convolution kernels to extract features from the pixels that form an image. In certain embodiments, the convolution layers of machine learning model 122 are implemented in the frequency domain, and the convolution process is accomplished using discrete Fourier transforms. This may be desirable to reduce the computational time associated with training and using machine learning model 122 for image classification purposes. For example, by converting to the frequency domain, the fast Fourier transform algorithm (FFT) may be implemented to perform the discrete Fourier transforms associated with the convolutions. Not only does the use of the FFT algorithm alone greatly reduce computational times when implemented on a single CPU (as compared with applying convolution kernels in the spatial domain), the FFT algorithm may be parallelized using one or more graphics processing units (GPUs), thereby further reducing computational times. Converting to the frequency domain may also be desirable to help ensure that the machine learning model 122 is translation and rotation invariant (e.g., the assignment made by the machine learning model 122 of an image to an item identifier, based on the presence of an item 308 in the image, should not depend on the position and/or orientation of the item 308 within the image).

As another example, the machine learning model 122 may be a supervised learning algorithm. Accordingly, in certain embodiments, image processing device 102 is configured to train the machine learning model 122 to assign input images to any of a set of predetermined item identifiers. The image processing device 102 may train the machine learning model 122 in any suitable manner. For example, in certain embodiments, the image processing device 102 trains the machine learning model 122 by providing the machine learning model 122 with training data (e.g. images) that includes a set of labels (e.g. item identifiers) attached to the input images. As another example, the machine learning model 122 may be an unsupervised learning algorithm. In such embodiments, the image processing device 102 is configured to train the machine learning model 122 by providing the machine learning model 122 with a collection of images and instructing the machine learning model 122 to classify these images with item identifiers identified by the image processing device 102, based on common features extracted from the images. The image processing device 102 may train the machine learning model 122 any time before inputting the images of an item 308 within a bounding box 312 into the machine learning model 122.

After training the machine learning model 122, the image processing device 102 may input images 318 of an item 308 within a bounding box 312 into the machine learning model 122. For example, the image processing device 102 may extract a portion of the composite image 306 (e.g. image 318) that corresponds with an item 308 within a bounding box 312. The image processing device 102 may then use the extracted portion of the composite image 306 as an input image for the machine learning model 122. In response to inputting an image in the machine learning model 122, the image processing device 102 receives an item identifier for an item 308 from the machine learning model 122. The item identifier corresponds with the item 308 that was identified within the image. Examples of item identifiers include, but are not limited to, an item name, a barcode, an item number, a serial number, or any other suitable type of identifier that uniquely identifies an item 308.

In some embodiments, the image processing device 102 may employ one or more image processing techniques without using the machine learning model 122 to identify an item 308 within a bounding box 312. Returning to the example shown in FIG. 3A, the image processing device 102 may employ object detection and/or OCR to identify text 316, logos, branding, colors, barcodes 314, or any other features of an item 308 that can be used to identify the item 308. In this case, the image processing device 102 may process pixels within the composite image 306 to identify text 316, colors, barcodes 314, patterns, or any other characteristics of an item 308. The image processing device 102 may then compare the identified features of the item 308 to a set of images of features that correspond with different items 308. For instance, the image processing device 102 may extract text 316 (e.g. a product name) from the image and may compare the text 316 to a set of images of text that is associated with different items 308. As another example, the image processing device 102 may determine a dominant color within the image and may compare the dominant color to a set of images of colors that are associated with different items 308. As another example, the image processing device 102 may identify a barcode 314 within the image and may compare the barcode 314 to a set of images of barcodes that are associated with different items 308. As another example, the image processing device 102 may identify logos or patterns within the image and may compare the identified logos or patterns to a set of images of logos or patterns that are associated with different items 308. In other examples, the image processing device 102 may identify any other suitable type or combination of features and compare the identified features to features that are associated with different items 308.

After comparing the identified features from the image to the set of features that are associated with different items 308, the image processing device 102 then determines whether a match is found. The image processing device 102 may determine that a match is found when at least a meaningful portion of the identified features match features that correspond with an item 308. In response to determining that a meaningful portion of features within the composite image 306 matches the features of an item 308, the image processing device 102 may output an item identifier that corresponds with the matching item 308. In other embodiments, the image processing device 102 may employ one or more image processing techniques in conjunction with the machine learning model 122 to identify an item 308 within the image using any combination of the techniques discussed above.

Determining Item Locations in the Composite Image

Figure 4:
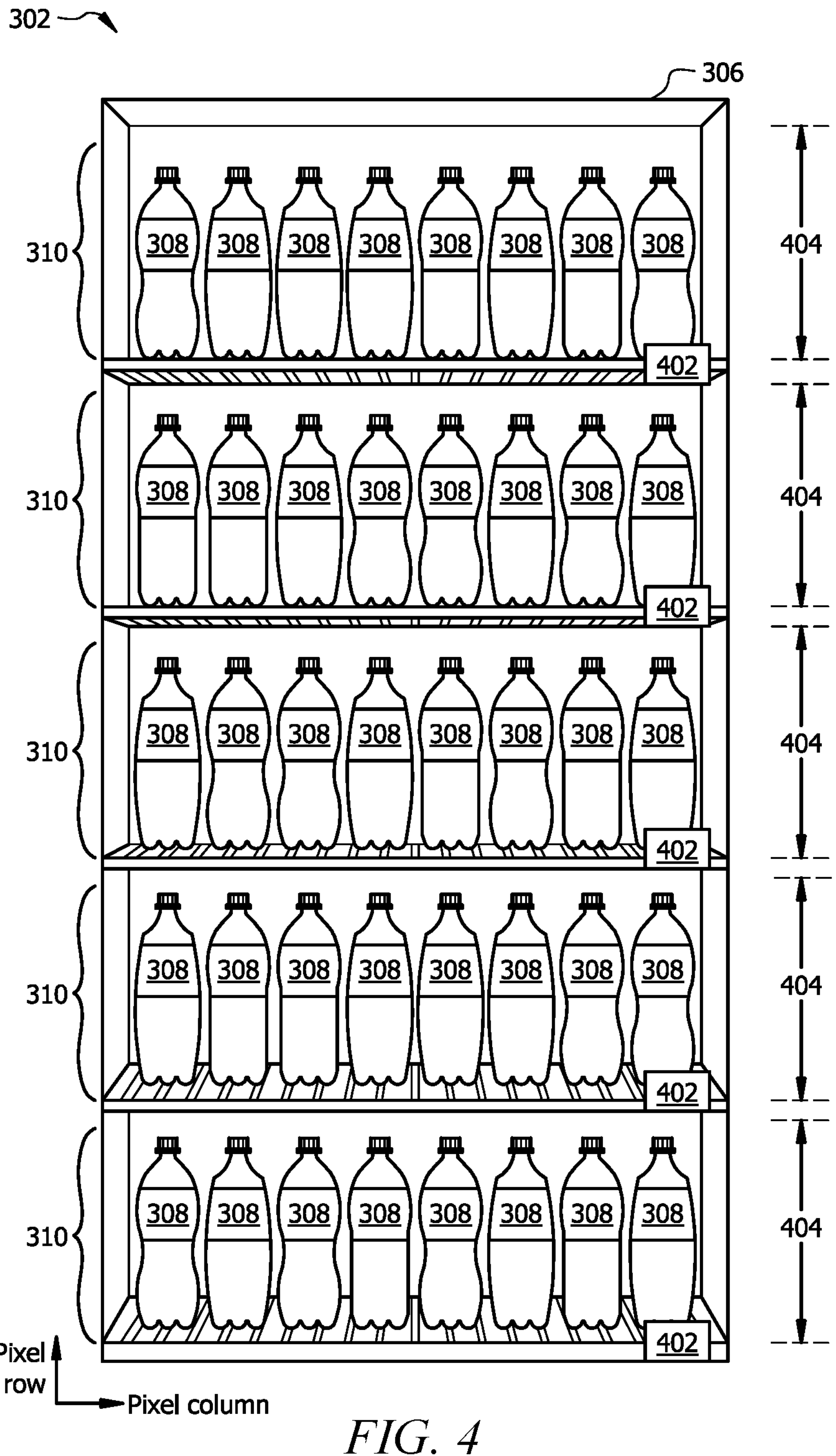
FIG. 4 is an example of a composite image of a rack with reference markers that identify its shelves.

After identifying the items 308 that are on the rack 302 in the composite image 306, the image processing device 102 then determines where the items 308 are located with respect to rack 302. This process generally involves determining which shelf 310 an item 308 is located on and the order of the items 308 that are on each shelf 310. This information is used later by the image processing device 102 when comparing the locations of the items 308 to their designated location in the master template 114 to determine whether the items 308 are in the correct locations. The image processing device 102 begins this process by first identifying the shelves 310 to determine which items 308 are placed on each shelf 310. Returning to FIG. 2 at step 210, the image processing device 102 identifies shelves 310 on the rack 302 in the composite image 306. In one embodiment, the image processing device 102 is configured to identify shelves 310 of the rack 302 using reference markers 402 that are located on or near the shelves 310 in the composite image 306. A reference marker 402 is any suitable type of object that can be identified within the composite image 306. Examples of reference markers 402 include, but are not limited to, an object (e.g. a tag or label) with text, an object with a barcode, an object with a graphical code (e.g. a Quick Response (QR) code or an Aruco marker), or any other suitable type of object with an identifier. Referring to FIG. 4 as an example, the rack 302 comprises reference markers 402 that are located on each shelf 310. The image processing device 102 may use any suitable type of object or feature detection algorithm to identify reference markers 402 within the composite image 306. In this example, the image processing device 102 detects five reference markers 402 which indicates that the rack 302 comprises five shelves 310.

After determining the number of shelves 310 that are present in the composite image 306, the image processing device 102 may also identify ranges of pixels 404 (e.g. pixel rows) in the composite image 306 that correspond with each shelf 310. In this case, the image processing device 102 may use the reference markers 402 to demarcate the beginning or end of each shelf 310 within the composite image 306. In the example shown in FIG. 4, the reference markers 402 are used to identify ranges of pixel rows 404 that correspond with each shelf 310. This process allows the image processing device 102 to reduce the search space when searching the composite image 306 to identify items 308 that are on a particular shelf 310. For example, this process allows the image processing device 102 to segment the composite image 306 into sections that correspond with each shelf 310 using identified the range of pixels 404. After associating each shelf 310 with a range of pixels 404 in the composite image 306, the image processing device 102 can then compare pixel values that are associated with an item 308 to the ranges of pixels 404 to determine which shelf 310 the item 308 is located on.

Figure 5:
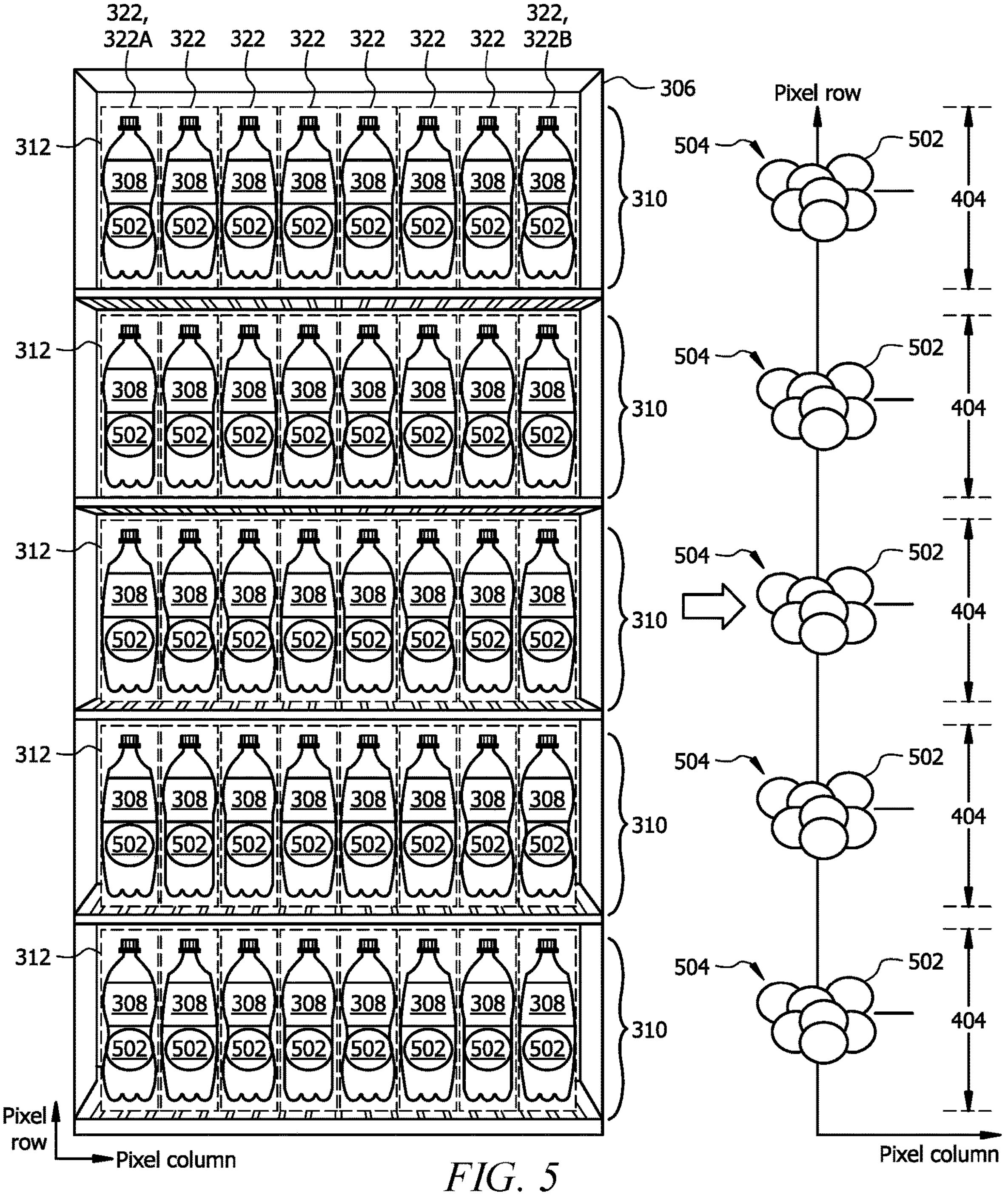
FIG. 5 is an example of clusters of pixels locations for items on a rack.

In another embodiment, the image processing device 102 may use information about the locations of items to identify and determine the locations of shelves 310. In this case, the image processing device 102 leverages the fact that items 308 that are lined up on a shelf 310 will have similar pixel row values in the composite image 306. This means that the image processing device 102 can identify the shelves 310 of the rack 302 by identifying the clusters of similar pixel row values. Referring to FIG. 5 as an example, the image processing device 102 is configured to identify shelves 310 on the rack 302 based on the location of items 308 that are on the rack 302. In this example, the image processing device 102 may first determine pixel locations 502 in the composite image 306 that correspond with each item 308 in the composite image 306. Each pixel location 502 corresponds with a pixel row value and a pixel column value in the composite image 306 where an item 308 is located. In one embodiment, the image processing device 102 may use the bounding boxes 312 that were previously generated in step 206 for this process. In this case, the image processing device 102 finds a mid-point or center for each bounding box 312. The image processing device 102 then uses the mid-point for each bounding box 312 as the pixel location 502 for the bounding boxes 312. The image processing device 102 then uses the pixel locations 502 to identify clusters 504 of items 308 which corresponds with the shelves 310 of the rack 302. As an example, the image processing device 102 may cluster the pixels locations 502 based on their pixel row values. In this example, the image processing device 102 may first set the pixel column value of the pixel locations 502 to a common value (e.g. a value of zero) and then generate a plot of the pixel locations 502. This process groups the pixel locations 502 together based on their pixel row values. An example of this process is also shown in FIG. 5. After plotting the pixel locations 502, the image processing device 102 may then identify clusters 504 of pixel locations 502. In the example shown in FIG. 5, the image processing device 102 identifies five clusters 504. Since each cluster 504 corresponds with a shelf 310 of the rack 302, the image processing device 102 will associate each cluster 504 with one of the shelves 310 of the rack 302. This process allows the image processing device 102 to identify the number of shelves 310 that are present in the rack 302 in the composite image 306 based on the locations of the items 308. This process provides a robust solution for identifying shelf 310 within a composite image 306 without relying on additional information such as reference markers 402 which may not always be present or visible in a composite image 306.

After determining the number of shelves 310 that are present in the composite image 306, the image processing device 102 may also identify ranges of pixels 404 (e.g. pixel rows) in the composite image 306 that correspond with each shelf 310. For example, the image processing device 102 may identify a range of pixel row values 404 that are within a predetermined number of pixels from an average pixel row value for a cluster 504. In other examples, the image processing device 102 may use any other suitable technique for identifying ranges of pixels row values 404 in the composite image 306 that correspond with each shelf 310. Once again, this process allows the image processing device 102 to reduce the search space when searching the composite image 306 to identify items 308 that are on a particular shelf 310. As discussed above, this process allows the image processing device 102 to segment the composite image 306 into sections that correspond with each shelf 310 using identified the range of pixels 404. After associating each shelf 310 with a range of pixels 404 in the composite image 306, the image processing device 102 can then compare pixel values that are associated with an item 308 to the ranges of pixels 404 to determine which shelf 310 the item 308 is located on.

After identifying the shelves 310 of the rack 302 within the composite image 306, the image processing device 102 will then associate each of the previously identified items 308 with a location on the rack 302 based on the shelf 310 where the item 308 is located at. Returning to FIG. 2 at step 212, the image processing device 102 associates each bounding box 312 with an item location on the rack 302. The item location identifies a shelf 310 on the rack 302 and a position on the identified shelf 310. For example, the position on the shelf 310 may indicate the location of an item 308 with respect to the other items 308 on the shelf 310. Returning to the example in FIG. 3A, each item 308 may be positioned in one of eight item locations 322 on a shelf 310. In this example, item 308A is located at a first item location 322A on the first shelf 310A and item 308B is located at the eighth item location 322B on the first shelf 310A. In other examples, a shelf 310 may have any other suitable number of item locations 322.

In one embodiment, the image processing device 102 first identifies which bounding boxes 312 are associated with each shelf 310. Returning to the example shown in FIG. 5, the image processing device 102 may identify which bounding boxes 312 have pixel values that are within the range of pixels 404 for each shelf 310. This process clusters the bounding boxes 312 based on the shelf 310 they are associated with. After clustering the bounding boxes 312 based on shelves 310, the image processing device 102 then sorts the bounding boxes 312 based on their locations on the shelf 310. For example, the image processing device 102 may sort the bounding boxes 312 based on their pixel column values. In this example, the bounding box 312 with the lowest pixel column values is in the first item location 322A on a shelf 310. The bounding box 312 with the highest pixel column values in the last item location 322B on the shelf 310. The image processing device 102 may then sort the remaining bounding boxes 312 for the shelf 310. Bounding boxes 312 with lower pixel column values are closer to the first item location 322A on the shelf 310 whereas bounding boxes 312 with a higher pixel column value are closer to the last item location 322B on the shelf 310. The image processing device 102 may repeat this process for each shelf 310 to sort the bounding boxes 312 for each shelf 310. After sorting the bounding boxes 312, the image processing device 102 then associates each bounding box 312 with an item location that identifies the shelf 310 it is associated with and its location on the shelf 310 with respect to the other items 308 on the same shelf 310.

Comparing Item Locations to the Master Template

After determining the locations for all of the identified items 308 within the composite image 306, the image processing device 102 will then compare the determined item locations to the designated item locations that are defined in the master template 114 that is associated with the rack 302. This process allows the image processing device 102 to determine whether the items 308 in the composite image 306 are in their correct locations. Returning to FIG. 2 at step 214, the image processing device 102 identifies a master template 114 for the rack 302. As an example, the image processing device 102 may use the rack identifier 118 that was previously obtained in step 202 as a search token to identify a master template 114 that is linked with the rack identifier 118. The master template 114 comprises information about the predefined locations of items 308 that are placed on the rack 302.

At step 216, the image processing device 102 determines whether the item locations match the rack positions from the master template for the rack 302. Here, the image processing device 102 determines whether there are any mismatches between the location of items 308 in the composite image 306 and their designated locations defined in the master template 114 for the rack 302. In one embodiment, the master template 114 may comprise a list of item identifiers that are organized by shelf 310 and sorted in order based on their position on a shelf 310. In this example, the image processing device 102 may also organize the determined item locations for the bounding boxes 312 by shelf 310 and in order based on their position on a shelf 310 in the composite image 306. The image processing device 102 then compares the determined item locations of the bounding boxes 312 to the rack positions for the items 308 in the master template 114 to determine whether there are any mismatches.

Figure 6:
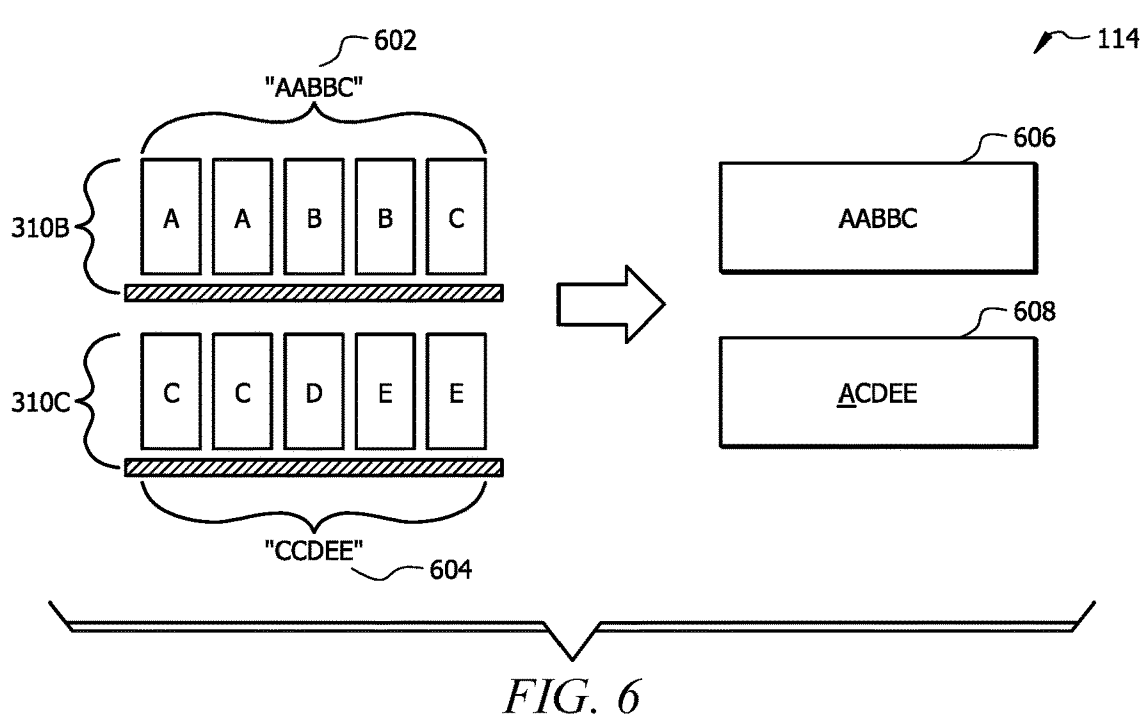
FIG. 6 is an example of comparing item locations to rack positions in a master template for a rack.

In another embodiment, the image processing device 102 may simplify the comparison process by leveraging text-based word comparison techniques to compare the determined item locations to the designated item locations that are defined in the master template 114. The item identifiers may vary and have discrepancies in spelling, naming conventions, and/or formatting. These differences may result in errors when comparing items 308 in the composite image 306 to items 308 in the master template 114. Instead of comparing the raw item identifiers to each other, the image processing device 102 may encode the item identifiers as alphanumeric words that can be compared to each other. This process also allows the image processing device 106 to determine recommendations for correcting any mismatches between items 308. This feature is described in more detail below. In this case, the image processing device 102 first converts the item identifiers for the items 308 that are on each shelf 310 into an alphanumeric word before making a comparison with the master template 114. Referring to FIG. 6 as an example, the image processing device 102 maps each item identifier to a unique alphanumeric character. For example, the image processing device 102 may use a look-up table that maps different item identifiers to an alphanumeric character. After encoding each item identifier as an alphanumeric character, the image processing device 102 then generates a word for each shelf 310 using the determined alphanumeric characters. In the example shown in FIG. 6, the image processing device 102 converts the item identifiers for a first shelf 310B into a first word 602 (i.e. "AABBC") and converts the item identifiers for a second shelf 310C into a second word 604 (i.e. "CCDEE"). The image processing device 102 may repeat this process for all of the shelf 310 on the rack 302. In this example, the master template 114 may also be configured to identify the rack positions of items 308 using words. In this example, the master template 114 comprises a first word 606 (i.e. "AABBC") that corresponds with the first shelf 310B of the rack 302 and a second word 608 (i.e. "ACDEE") that corresponds with the second shelf 310C of the rack 302. Since the item identifiers are both encoded using words, the image processing device 102 may use a text-based string comparison to determine whether the words for each shelf 310 from the composite image 306 matches a corresponding word for the shelf 310 from the master template 114. In the example shown in FIG. 6, the image processing device 102 determines that the word that is associated with the first shelf 310B matches the corresponding word for the first shelf 310B in the master template 114. However, in this example, the image processing device 102 also determines that the word that is associated with the second shelf 310C does not match the corresponding word for the second shelf 310C in the master template 114. When there is a mismatch between a word for a shelf 310 and its corresponding word in the master template 114, the image processing device 102 may identify the position of the alphanumeric character that has the mismatch and the value of the alphanumeric character. The image processing device 102 then converts the alphanumeric character back to its original item identifier. For example, the image processing device 102 may once again use a look-up table to convert the alphanumeric characters back to their original item identifiers. This process allows the image processing device 102 to use a text-based string comparison to determine which item 308 is in the wrong location on the rack 302.

In some embodiments, the image processing device 102 may be further configured to provide recommendations for correcting any detected mismatches based on the text-based comparison. For example, the image processing device 102 may perform a Levenshtein distance operation between the word that is associated with a shelf 310 and a corresponding word for the shelf 310 in the master template 114. The Levenshtein distance between two words is the minimum number of single-character edits (e.g. insertions, deletions, or substitutions) that are required to change one word into the other. This process allows the image processing device 102 to both detect a mismatch between words and to identify how the mismatch can be resolved by adding an item 308, removing an item 308, or substituting an item 308. In other examples, the image processing device 102 may use any other suitable word comparison technique to identify mismatches and/or to identify how to resolve mismatches.

Returning to FIG. 2, the image processing device 102 proceeds to step 218 in response to determining that the item locations match the rack positions from the master template 114 for the rack 302. In this case, the image processing device 102 determines that all of the items 308 are in their correct locations on the rack 302. At step 218, the image processing device 102 generates a rack analysis message 120 that indicates that the items 308 are in their correct locations on the rack 302. The rack analysis message 120 may comprise a text-based or graphics-based confirmation message that indicates that all of the items 308 are in their correct locations on the rack 302.

Returning to step 216, the image processing device 102 proceeds to step 220 in response to determining that one or more of the item locations does not match the rack positions from the master template 114 for the rack 302. In this case, the image processing device 102 determines that one or more items 308 are in the wrong location on the rack 302. At step 220, the image processing device 102 generates a rack analysis message 120 that indicates that one or more items 308 are in the wrong location on the rack 302. In one embodiment, the image processing device 102 may generate the rack analysis message 120 by first identifying any mismatches between the determined item locations from the composite image 306 and the rack positions from the master template 114. After identifying any mismatches, the image processing device 102 then identifies the items 308 that are associated with the mismatches. The image processing device 102 then generates a rack analysis message 120 that comprises item identifiers and/or rack position information that identifies the items 308 that are placed in the wrong locations. As an example, the image processing device 102 may generate a text-based rack analysis message 120 that comprises the item identifiers and rack position information. As another example, the image processing device 102 may generate a graphics-based rack analysis message 120 that visually shows the item identifiers and rack position information in the context of the composite image 306 using colored overlays. For instance, the rack analysis message 120 may overlay green bounding boxes 312 with items 308 that are in the correct locations and red bounding boxes 312 with items 308 that are in the wrong locations. In other examples, the image processing device 102 may generate the rack analysis message 120 using any other suitable type of format or representation to provide the item identifiers and rack position information. In some embodiments, the generated rack analysis message 120 further comprises any recommendations for correcting any detected mismatches that were previously determined.

Outputting the Rack Analysis Message

After determining whether the items 308 in the composite image 306 are in their correct locations, the image processing device 102 will output the analysis results back to the user device 104 in the rack analysis message 120. At step 22, the image processing device 102 outputs the rack analysis message 120. The image processing device 102 may send the rack analysis message 120 to the user device 104 using any suitable messaging technique or protocol. For example, the image processing device 102 may send the rack analysis message 120 to the user device 104 using an application or a web browser. After receiving the rack analysis message 120, the user device 104 may display the results from a rack analysis message 120 to a user using a graphical user interface (e.g. a display or touchscreen).

Hardware Configuration for the Image Processing Device

Figure 7:
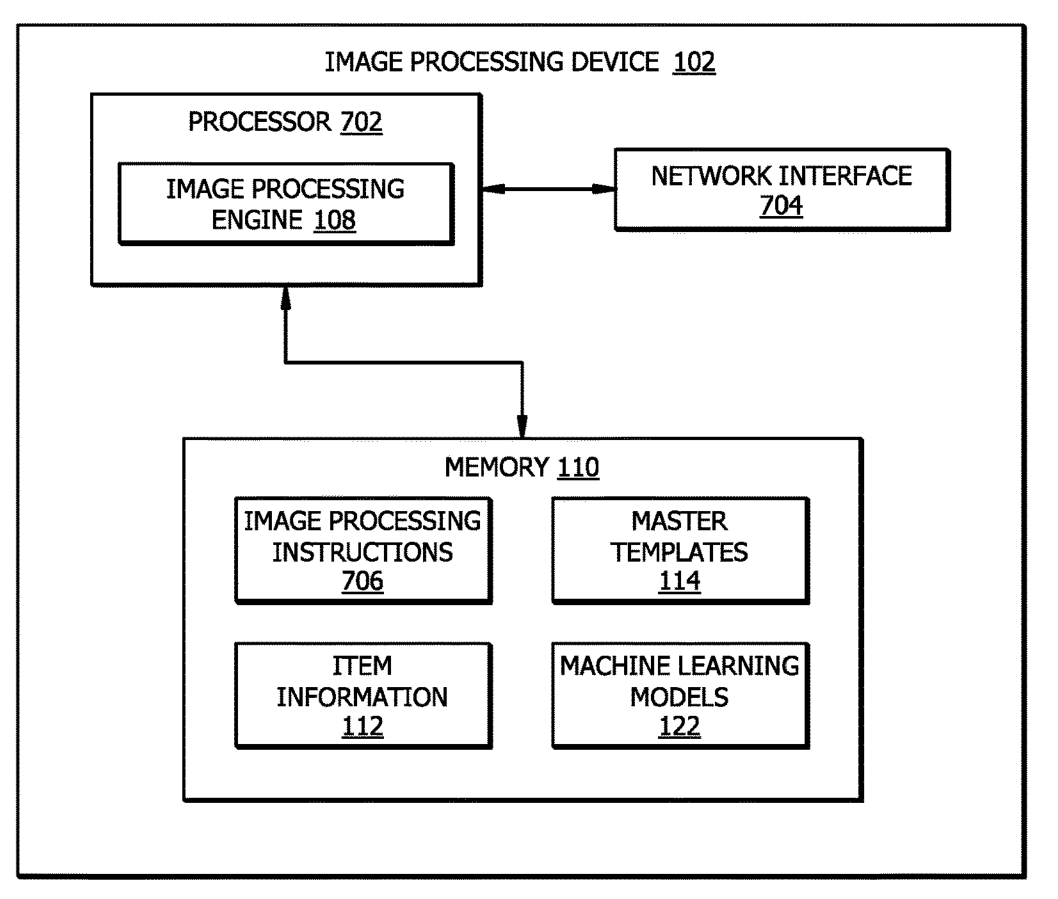
FIG. 7 is an embodiment of an image processing device configured to employ the item location tracking process for the item tracking system.

FIG. 7 is an embodiment of an image processing device 102 for the item tracking system 100. As an example, the image processing device 102 may be a computer or server. The image processing device 102 comprises a processor 702, a memory 110, and a network interface 704. The image processing device 102 may be configured as shown or in any other suitable configuration.

Processor

The processor 702 is a hardware device that comprises one or more processors operably coupled to the memory 110. The processor 702 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 702 may be a programmable logic device, a microcontroller, a microprocessor, or any suitable combination of the preceding. The processor 702 is communicatively coupled to and in signal communication with the memory 110 and the network interface 704. The one or more processors are configured to process data and may be implemented in hardware or software. For example, the processor 702 may be 8-bit, 16-bit, 32-bit, 64-bit, or of any other suitable architecture. The processor 702 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute image processing instructions 706 to implement the image processing engine 108. In this way, processor 702 may be a special-purpose computer designed to implement the functions disclosed herein. In an embodiment, the image processing engine 108 is implemented using logic units, FPGAs, ASICs, DSPs, or any other suitable hardware. The image processing engine 108 is configured to operate as described in FIGS. 1-6. For example, the image processing engine 108 may be configured to perform the steps of process 200 as described in FIG. 2.

Memory

The memory 110 is a hardware device that is operable to store any of the information described above with respect to FIGS. 1-6 along with any other data, instructions, logic, rules, or code operable to implement the function(s) described herein when executed by the processor 702. The memory 110 comprises one or more disks, tape drives, or solid-state drives, and may be used as an over-flow data storage device, to store programs when such programs are selected for execution, and to store instructions and data that are read during program execution. The memory 110 may be volatile or non-volatile and may comprise a read-only memory (ROM), random-access memory (RAM), ternary content-addressable memory (TCAM), dynamic random-access memory (DRAM), and static random-access memory (SRAM).

The memory 110 is operable to store image processing instructions 706, item information 112, master templates 114, machine learning models 122, and/or any other data or instructions. The image processing instructions 706 may comprise any suitable set of instructions, logic, rules, or code operable to execute the image processing engine 108. The item information 112, the master templates 114, and machine learning models 122 are configured similar to the item information 112, the master templates 114, and machine learning models 122 described in FIGS. 1-6, respectively.

Network Interface

The network interface 704 is a hardware device that is configured to enable wired and/or wireless communications. The network interface 704 is configured to communicate data between user devices 104 and other devices, systems, or domains. For example, the network interface 704 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 702 is configured to send and receive data using the network interface 704. The network interface 704 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An image processing device, comprising:

a memory operable to store a master template that is associated with a rack, wherein:

the master template identifies a plurality of rack positions that each identify a shelf of the rack and a position on the shelf; and each rack position is associated with an item; and a processor operably coupled to the memory, and configured to:

receive a rack identifier that identifies a rack configured to hold a plurality of items;

identify the master template that is associated with the rack based on the rack identifier;

receive a set of images of the plurality of items on the rack;

combine the set of images into a composite image;

generate a plurality of bounding boxes, wherein each bounding box corresponds with an item on the rack in the composite image;

execute a machine-learning algorithm associated with a machine-learning model to associate each bounding box from the plurality of bounding boxes with an item identifier;

identify a plurality of shelves on the rack within the composite image by:

identifying reference markers located on each shelf of the rack from the composite image; and identifying a range of pixels in the composite image that corresponds to each shelf of the rack based on the reference markers, wherein a plurality of pixels of the composite image that are positioned between two reference markers is identified as the range of pixels corresponding to a particular shelf of the rack;

associate each bounding box from the plurality of bounding boxes with an item location based at least on the range of pixels identified for each shelf of the rack, wherein each item location identifies a shelf from among the plurality of shelves on the rack and a position on the shelf, wherein the associating comprises:

for each bounding box:

comparing pixel positions of those pixels in the composite image that are included in the bounding box with the range of pixels associated with each shelf;

determining based on the comparing that at least a portion of the pixels included in the bounding box are within the range of pixels associated with a particular shelf;

determining that a particular item identified within the bounding box is placed on the particular shelf;

for each shelf of the rack:

generate a cluster of bounding boxes, wherein the cluster of bounding boxes corresponding to that shelf comprises all bounding boxes having at least a portion of pixels that are within the range of pixels associated with that shelf, wherein to generate the cluster of bounding boxes, the processor is configured to:

set a pixel column value in pixel locations, corresponding to items on the shelf, to a common value; and generate a plot of the pixel locations, wherein pixel row values in the pixel locations are grouped to form the cluster;

sort the bounding boxes from the cluster of bounding boxes based on column values of pixels associated with the bounding boxes, wherein a bounding box associated with lower column values of pixels is determined to be placed nearer to one end of the shelf as compared to another bounding box associated with higher column values of pixels; and compare item locations for each bounding box to the plurality of rack positions from the master template;

generate a rack analysis message based on the comparison of the item locations for each bounding box and the plurality of rack positions from the master template, wherein the rack analysis message indicates whether the plurality of items are in correct locations on the rack; and output the rack analysis message.

2. The device of claim 1, wherein identifying the plurality of shelves on the rack within the composite image comprises:

determining a pixel location in the composite image for each item from among the plurality of items within the composite image, wherein the pixel location identifies a pixel row value and a pixel column value within the composite image;

identifying a plurality of clusters based on pixel rows values for the plurality of items; and associating each cluster from the plurality of clusters with a shelf.

3. The device of claim 1, wherein generating the plurality of bounding boxes comprises:

determining an overlap percentage between a first bounding box from the plurality of bounding boxes and a second bounding box from the plurality of bounding boxes;

determining the overlap percentage is greater than a predetermined threshold value; and removing one of the first bounding box or the second bounding box in response to determining that the overlap percentage is greater than the predetermined threshold value.

4. The device of claim 1, wherein associating each bounding box from the plurality of bounding boxes with an item identifier comprises:

extracting a portion of the composite image within a first bounding box from among the plurality of bounding boxes;

inputting the portion of the composite image into a machine learning model that is configured to output an item identifier based on features of a first item that are present in the portion of the composite image;

receiving a first item identifier for the first item in response to inputting the portion of the composite image into the machine learning model; and associating the first bounding box with the first item identifier for the first item.

5. The device of claim 1, wherein associating each bounding box from the plurality of bounding boxes with an item identifier comprises:

extracting a portion of the composite image within a first bounding box from among the plurality of bounding boxes;

comparing the portion of the composite image to a plurality of images of items;

identifying a first image from among the plurality of images of items that at least partially matches the portion of the composite image;

identifying a first item identifier that corresponds with the first image; and associating the first bounding box with the first item identifier for the first item.

6. The device of claim 1, wherein generating the rack analysis message comprises:

identifying a mismatch between a first item location and a first rack position from the master template;

identifying a first item associated with the first rack position from the master template; and generating the rack analysis message that identifies the first item and the first rack position from the master template.

7. The device of claim 1, wherein comparing the item locations for each bounding box to the plurality of rack positions from the master template comprises:

selecting a first shelf from among the plurality of shelves;

identifying a set of item identifiers that are associated with the first shelf;

assigning an alphanumeric character to each item identifier from among the set of item identifiers;

combining the alphanumeric characters to form a first word for the first shelf;

identifying a second word from the master template that corresponds with the first shelf; and comparing the first word to the second word.

8. The device of claim 1, wherein generating the rack analysis message comprises:

identifying a mismatch between a first item location and a first rack position from the master template; and generating the rack analysis message that comprises a recommendation for resolving the mismatch.

9. An item location tracking method, comprising:

receiving a rack identifier that identifies a rack configured to hold a plurality of items;

identifying a master template that is associated with the rack based on the rack identifier, wherein:

the master template identifies a plurality of rack positions that each identify a shelf of the rack and a position on the shelf; and each rack position is associated with an item;

receiving a set of images of the plurality of items on the rack;

combining the set of images into a composite image;

generating a plurality of bounding boxes, wherein each bounding box corresponds with an item on the rack in the composite image;

executing a machine-learning algorithm associated with a machine-learning model to associate each bounding box from the plurality of bounding boxes with an item identifier;

identifying a plurality of shelves on the rack within the composite image by:

identifying reference markers located on each shelf of the rack from the composite image; and identifying a range of pixels in the composite image that corresponds to each shelf of the rack based on the reference markers, wherein a plurality of pixels of the composite image that are positioned between two reference markers is identified as the range of pixels corresponding to a particular shelf of the rack;

associating each bounding box from the plurality of bounding boxes with an item location based at least on the range of pixels identified for each shelf of the rack, wherein each item location identifies a shelf from among the plurality of shelves on the rack and a position on the shelf, wherein the associating comprises:

for each bounding box:

comparing pixel positions of those pixels in the composite image that are included in the bounding box with the range of pixels associated with each shelf;

determining based on the comparing that at least a portion of the pixels included in the bounding box are within the range of pixels associated with a particular shelf;

determining that a particular item identified within the bounding box is placed on the particular shelf;

for each shelf of the rack:

generating a cluster of bounding boxes, wherein the cluster of bounding boxes corresponding to that shelf comprises all bounding boxes having at least a portion of pixels that are within the range of pixels associated with that shelf, wherein to generate the cluster of bounding boxes, the processor is configured to:

set a pixel column value in pixel locations, corresponding to items on the shelf, to a common value; and generate a plot of the pixel locations, wherein pixel row values in the pixel locations are grouped to form the cluster;

sorting the bounding boxes from the cluster of bounding boxes based on column values of pixels associated with the bounding boxes, wherein a bounding box associated with lower column values of pixels is determined to be placed nearer to one end of the shelf as compared to another bounding box associated with higher column values of pixels;

comparing item locations for each bounding box to the plurality of rack positions from the master template;

generating a rack analysis message based on the comparison of the item locations for each bounding box and the plurality of rack positions from the master template, wherein the rack analysis message indicates whether the plurality of items are in correct locations on the rack; and outputting the rack analysis message.

10. The method of claim 9, wherein identifying the plurality of shelves on the rack within the composite image comprises:

determining a pixel location in the composite image for each item from among the plurality of items within the composite image, wherein the pixel location identifies a pixel row value and a pixel column value within the composite image;

identifying a plurality of clusters based on pixel rows values for the plurality of items; and associating each cluster from the plurality of clusters with a shelf.

11. The method of claim 9, wherein generating the plurality of bounding boxes comprises:

determining an overlap percentage between a first bounding box from the plurality of bounding boxes and a second bounding box from the plurality of bounding boxes;

determining the overlap percentage is greater than a predetermined threshold value; and removing one of the first bounding box or the second bounding box in response to determining that the overlap percentage is greater than the predetermined threshold value.

12. The method of claim 9, wherein associating each bounding box from the plurality of bounding boxes with an item identifier comprises:

extracting a portion of the composite image within a first bounding box from among the plurality of bounding boxes;

inputting the portion of the composite image into a machine learning model that is configured to output an item identifier based on features of a first item that are present in the portion of the composite image;

receiving a first item identifier for the first item in response to inputting the portion of the composite image into the machine learning model; and associating the first bounding box with the first item identifier for the first item.

13. The method of claim 9, wherein associating each bounding box from the plurality of bounding boxes with an item identifier comprises:

extracting a portion of the composite image within a first bounding box from among the plurality of bounding boxes;

comparing the portion of the composite image to a plurality of images of items;

identifying a first image from among the plurality of images of items that at least partially matches the portion of the composite image;

identifying a first item identifier that corresponds with the first image; and associating the first bounding box with the first item identifier for the first item.

14. The method of claim 9, wherein generating the rack analysis message comprises:

identifying a mismatch between a first item location and a first rack position from the master template;

identifying a first item associated with the first rack position from the master template; and generating the rack analysis message that identifies the first item and the first rack position from the master template.

15. The method of claim 9, wherein comparing the item locations for each bounding box to the plurality of rack positions from the master template comprises:

selecting a first shelf from among the plurality of shelves;

identifying a set of item identifiers that are associated with the first shelf;

assigning an alphanumeric character to each item identifier from among the set of item identifiers;

combining the alphanumeric characters to form a first word for the first shelf;

identifying a second word from the master template that corresponds with the first shelf; and comparing the first word to the second word.

16. The method of claim 9, wherein generating the rack analysis message comprises:

identifying a mismatch between a first item location and a first rack position from the master template; and generating the rack analysis message that comprises a recommendation for resolving the mismatch.

17. A non-transitory computer-readable medium storing instructions that when executed by a processor cause the processor to:

receive a rack identifier that identifies a rack configured to hold a plurality of items;

identify a master template that is associated with the rack based on the rack identifier, wherein:

the master template identifies a plurality of rack positions that each identify a shelf of the rack and a position on the shelf; and each rack position is associated with an item;

receive a set of images of the plurality of items on the rack;

combine the set of images into a composite image;

generate a plurality of bounding boxes, wherein each bounding box corresponds with an item on the rack in the composite image;

execute a machine-learning algorithm associated with a machine-learning model to associate each bounding box from the plurality of bounding boxes with an item identifier;

identify a plurality of shelves on the rack within the composite image by:

identifying reference markers located on each shelf of the rack from the composite image; and identifying a range of pixels in the composite image that corresponds to each shelf of the rack based on the reference markers, wherein a plurality of pixels of the composite image that are positioned between two reference markers is identified as the range of pixels corresponding to a particular shelf of the rack;

associate each bounding box from the plurality of bounding boxes with an item location based at least on the range of pixels identified for each shelf of the rack, wherein each item location identifies a shelf from among the plurality of shelves on the rack and a position on the shelf, wherein the associating comprises:

for each bounding box:

comparing pixel positions of those pixels in the composite image that are included in the bounding box with the range of pixels associated with each shelf;

determining based on the comparing that at least a portion of the pixels included in the bounding box are within the range of pixels associated with a particular shelf;

determining that a particular item identified within the bounding box is placed on the particular shelf;

for each shelf of the rack:

generating a cluster of bounding boxes, wherein the cluster of bounding boxes corresponding to that shelf comprises all bounding boxes having at least a portion of pixels that are within the range of pixels associated with that shelf, wherein to generate the cluster of bounding boxes, the processor is configured to:

set a pixel column value in pixel locations, corresponding to items on the shelf, to a common value; and generate a plot of the pixel locations, wherein pixel row values in the pixel locations are grouped to form the cluster;

sorting the bounding boxes from the cluster of bounding boxes based on column values of pixels associated with the bounding boxes, wherein a bounding box associated with lower column values of pixels is determined to be placed nearer to one end of the shelf as compared to another bounding box associated with higher column values of pixels;

compare item locations for each bounding box to the plurality of rack positions from the master template;

generate a rack analysis message based on the comparison of the item locations for each bounding box and the plurality of rack positions from the master template, wherein the rack analysis message indicates whether the plurality of items are in correct locations on the rack; and output the rack analysis message.

18. The non-transitory computer-readable medium of claim 17, wherein identifying the plurality of shelves on the rack within the composite image comprises:

determining a pixel location in the composite image for each item from among the plurality of items within the composite image, wherein the pixel location identifies a pixel row value and a pixel column value within the composite image;

identifying a plurality of clusters based on pixel rows values for the plurality of items; and associating each cluster from the plurality of clusters with a shelf.

19. The non-transitory computer-readable medium of claim 17, wherein generating the plurality of bounding boxes comprises:

determining an overlap percentage between a first bounding box from the plurality of bounding boxes and a second bounding box from the plurality of bounding boxes;

determining the overlap percentage is greater than a predetermined threshold value; and removing one of the first bounding box or the second bounding box in response to determining that the overlap percentage is greater than the predetermined threshold value.

20. The non-transitory computer-readable medium of claim 17, wherein associating each bounding box from the plurality of bounding boxes with an item identifier comprises:

extracting a portion of the composite image within a first bounding box from among the plurality of bounding boxes;

inputting the portion of the composite image into a machine learning model that is configured to output an item identifier based on features of a first item that are present in the portion of the composite image;

receiving a first item identifier for the first item in response to inputting the portion of the composite image into the machine learning model; and associating the first bounding box with the first item identifier for the first item.

21. The non-transitory computer-readable medium of claim 17, wherein associating each bounding box from the plurality of bounding boxes with an item identifier comprises:

extracting a portion of the composite image within a first bounding box from among the plurality of bounding boxes;

comparing the portion of the composite image to a plurality of images of items;

identifying a first image from among the plurality of images of items that at least partially matches the portion of the composite image;

identifying a first item identifier that corresponds with the first image; and associating the first bounding box with the first item identifier for the first item.

22. The non-transitory computer-readable medium of claim 17, wherein generating the rack analysis message comprises:

identifying a mismatch between a first item location and a first rack position from the master template;

identifying a first item associated with the first rack position from the master template; and generating the rack analysis message that identifies the first item and the first rack position from the master template.

23. The non-transitory computer-readable medium of claim 17, wherein comparing the item locations for each bounding box to the plurality of rack positions from the master template comprises:

selecting a first shelf from among the plurality of shelves;

identifying a set of item identifiers that are associated with the first shelf;

assigning an alphanumeric character to each item identifier from among the set of item identifiers;

combining the alphanumeric characters to form a first word for the first shelf;

identifying a second word from the master template that corresponds with the first shelf; and comparing the first word to the second word.

24. The non-transitory computer-readable medium of claim 17, wherein generating the rack analysis message comprises:

identifying a mismatch between a first item location and a first rack position from the master template; and generating the rack analysis message that comprises a recommendation for resolving the mismatch.

* * * * *